March 23, 1926.  
O. H. WHITE  
GAME  
Filed June 3, 1924  
1,578,225
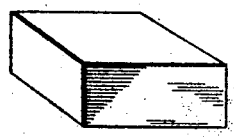
Fig. 1.
Fig. 2
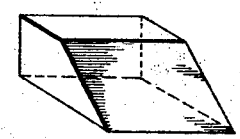
Fig. 3
Fig. 4
Fig. 8
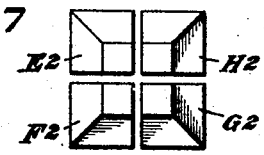
Fig. 7
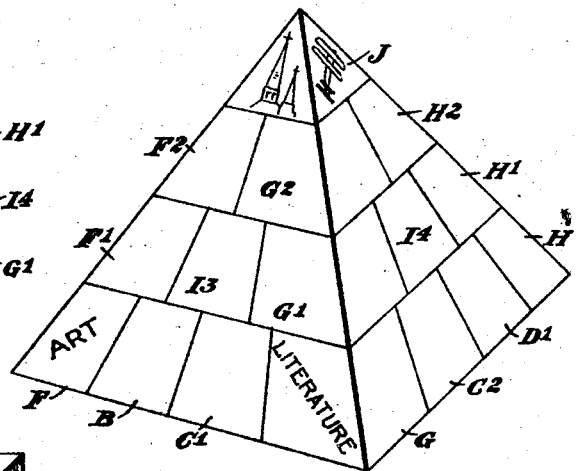
Fig. 10
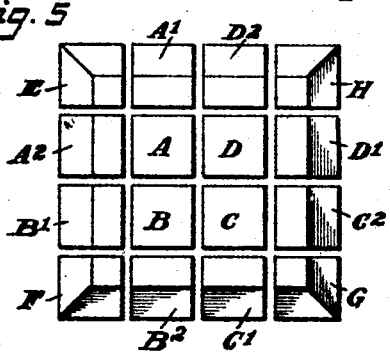
Fig. 6  
Fig. 5
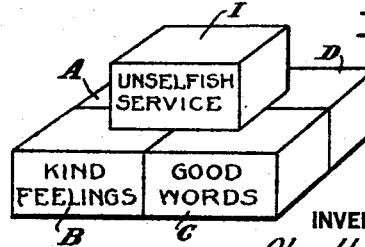
Fig. 9
INVENTOR  
Olga H. White  
BY  
Marshall & Hawley  
ATTORNEYS Patented Mar. 23, 1926.

1,578,225

UNITED STATES PATENT OFFICE.

OLGA H. WHITE, OF NEW YORK, N. Y.

GAME.

Application filed June 3, 1924. Serial No. 717,470.

*To all whom it may concern:*

Be it known that I, OLGA H. WHITE, a citizen of the United States, and a resident of New York, county and State of New York, United States of America, have invented certain new and useful Improvements in Games, of which the following is a specification.

This invention has for its object the provision of a plurality of coordinated blocks bearing descriptive or suggestive insignia, for the purpose of teaching children desired principles, and to thereby provide a game or toy which is primarily devised for educational purposes, but which appeals to children as a desirable plaything. More specifically its object is to provide a set of blocks, some of which representing fundamental ethical principles are shaped to form the foundation elements of a pyramidal structure, others of which representing principles closely related to the chosen fundamentals are adapted to be laid adjacent to the foundation elements to provide the sides of the pyramidal structure, others representing ideas which connect the ideas represented by adjacent side blocks, adapted to form the corners of the pyramidal structure, and a single block representing the resultant of all of the principles upon which the structure is built, of pyramidal form and adapted to form the apex of the finished structure.

To these ends I have provided a plurality of blocks each having a square base, the bases of all of the blocks being of the same size, and said blocks being of such shapes as together form the desired pyramidal structure.

I will describe my invention in the following specfication and point out the novel features thereof in appended claims.

Referring to the drawings:

Fig. 1 is a perspective view of one of five blocks which represent the aforesaid fundamentals.

Fig. 2 is a perspective view of one of twelve blocks which form the corners of the structure.

Fig. 3 is a perspective view of one of twelve side blocks.

Fig. 4 is a perspective view of the block which forms the apex of the structure.

Fig. 5 is a plan view of the sixteen blocks which are used to form the first tier or base of the structure. The blocks are shown slightly separated in order to illustrate clearly the manner in which they are to be assembled.

Fig. 6 is a plan view of the nine blocks, similarly separated, whch are used to form the second tier.

Fig. 7 is a plan view of the four blocks of the third tier, and

Fig. 8 is a plan view of the apex block which forms the fourth tier.

Fig. 9 is a perspective view of the five fundamental blocks assembled.

Fig. 10 is a perspective view of the finished pyramid.

Like characters of reference designate corresponding parts in all the figures of the drawings, which figures to better illustrate the invention, have been shown on different scales from each other, not all figures showing the indicia.

In order to more clearly describe my invention I will show the manner of using the blocks or of playing the educational game for which they are designed.

First, four of the blocks of Fig. 1 are assembled as shown in Fig. 5 in which they are designated by the letters A, B, C, D. These blocks represent four fundamentals of life or of education and preferably bear words, pictures or appropriate insignia representing, for example, good thoughts, kind feelings, good words, kind acts.

Next two of the side blocks of Fig. 3 with insignia appropriate to "good thoughts" are placed at the sides of the block A, at the positions $A^1$ and $A^2$. These may represent, for example, a mother reading to a child, at $A^1$, and a child buying a book for its mother, at $A^2$. To complete this quadrant of the base, one of the corner blocks of Fig. 2 is placed at E. This may be one representing "Literature" which forms an appropriate link between the blocks at $A^1$ and $A^2$.

Next, two side blocks, appropriate to the "kind feeling" block at B are placed at $B^1$ and $B^2$, representing, for example, arranging flowers, and drawing a picture. A corner block at F, representing "Art" properly links the blocks at $B^1$ and $B^2$.

Adjacent the "good word" block at C, are put the side blocks at $C^1$ and $C^2$ bearing insignia of a child singing and of a babbling brook, both representative of tone, and these are joined by a corner block at G representing "Music".

Similarly, side blocks are placed at D¹ and D² adjacent the "Kind act" block at D, and these may represent respectively a child lifting a load for an old man, and a boy playing with an erector set. These are joined by a corner block at H representing "Science".

Thus the first tier or foundation of the pyramid is constructed of blocks representing fundamental principles of life, between others which stand for expressions of these fundamentals, joined at the corners by blocks representing "Literature", "Art", "Music" and "Science". The top of this tier is a square, two-thirds the area of its bottom. Upon it the next tier is constructed as shown in Fig. 6.

Another "fundamental" block is placed at I, (Figs. 3 and 9), representing in this case unselfish service. At its four sides are placed four of the blocks of Fig. 3 in the positions I¹, I², I³, and I⁴, appropriately representing expressions of service, such, for example, as writing on stone, making a book of etchings, cathedral chimes, practicing on a harp; and between adjacent side blocks are placed corner blocks representing as before "Literature", "Art", "Music" and "Science", in the positions indicated at E¹, F¹, G¹ and H¹.

The third tier is formed of four of the corner blocks of Fig. 2 as shown in Figs. 7 and 10 at E², F², G² and H².

The block J of Figs. 4, 8 and 10 forms the pinnacle or apex of the structure, and this represents the ultimate and highest embodiments of the principles upon which it rests. For example, it may have on its four sides pictures of Shakespear representing the highest expression of Literature, of Cathedral Spires, representing Art, of Saint Cecilia at the Organ, for Music, and of an airplane as a high embodiment or expression of Science. The blocks are to be positioned one at a time with its lesson explained and as each block is added to the structure, its relation to the others is pointed out, so that a child can understand and be taught great truths representing both the inner growth of the character and outer expressions of life, and can be shown how such growth depends upon fundamental truths and principles.

I have pointed out briefly, examples of the nature of the pictures or insignia which the blocks may bear, but have not attempted to illustrate them in the drawings, first because I do not wish to limit myself to any specific set or kind of pictures, as the blocks are adaptable for teaching other subjects, for example,—religion,—and second because such illustration would only complicate the drawings and would in no sense serve to clarify the description of my invention.

Having now described my invention, what I claim is:

1. An educational game comprising a plurality of coordinated blocks bearing indicia, together arranged to be built into a pyramid, said blocks each having a square base at least one of said blocks being rectangular and arranged to form a body portion of the structure and adapted by its indicia to represent a fundamental principle to be taught by the blocks, side blocks arranged to fit against the sides of said rectangular block or blocks and having inclined surfaces to form the surface of the pyramid, and adapted by their indicia to represent expressions of the principle represented by the adjacent rectangular block, and corner blocks arranged to fit between adjacent sides of the side blocks to form the corners of the pyramid and adapted by their indicia to represent principles joining the expressions on said adjacent side blocks, and an apex block arranged to form the top of the structure and adapted by their indicia to represent all ultimate result of the principles represented by the other blocks.

2. An educational game comprising a plurality of coordinated blocks bearing indicia, together arranged to be built into a pyramid, said blocks having square bases of equal size at least one of said blocks being rectangular and arranged to form a body portion of the structure and adapted by its indicia to represent a fundamental principle to be taught by the blocks, side blocks arranged to fit against the sides of said rectangular block or blocks and having inclined surfaces to form the surface of the pyramid, and adapted by their indicia to represent expressions of the principle represented by the adjacent rectangular block, and corner blocks arranged to fit between adjacent sides of the side blocks to form the corners of the pyramid and adapted by their indicia to represent principles joining the expressions on said adjacent side blocks, and an apex block arranged to form the top of the structure and adapted by its indicia to represent the ultimate result of the principles represented by the other blocks.

3. An educational game comprising a plurality of coordinated blocks bearing indicia, together arranged to be built into a pyramid, said blocks having square bases of equal size, at least one of said blocks being rectangular and arranged to form a body portion of the structure and adapted by its indicia to represent a fundamental principle to be taught by the blocks, side blocks arranged to fit against the sides of said rectangular block or blocks and having inclined surfaces to form the surface of the pyramid, and adapted by their indicia to represent expressions of the principle represented by the adjacent rectangular block, and corner blocks arranged to fit between adjacent sides of the side blocks to form the corners of the pyramid and adapted by their indicia to represent principles joining the expressions on said adjacent side blocks, all of the aforesaid blocks having flat upper surfaces parallel with their bases, and an apex block arranged to form the top of the structure and adapted by its indicia to represent the ultimate result of the principles represented by the other blocks.

4. An educational game comprising a plurality of coordinated blocks bearing indicia, together arranged to be built into a pyramid, said blocks having square bases of equal size and said blocks comprising four rectangular body blocks and a fifth rectangular block to be placed over said four blocks with its sides parallel to their sides, a set of side blocks having five flat sides in rectangular relation and a sixth inclined side, corner blocks having four flat sides in rectangular relation and two inclined sides, and an apex block having one flat side and four flat sides inclined thereto, the indicia on said blocks representing fundamentals of character.

5. An educational device for teaching fundamental principles of character building, comprising a series of co-related blocks so designated and shaped, whereby they may be so arranged that the designations and arrangement will illustrate moral character.

6. An educational device for teaching fundamental principles of character building, comprising a series of co-related blocks, so designated and adapted to be so arranged that the designation and arrangement will illustrate moral character and so shaped as to permit fitting of blocks together in a systematic arrangement.

7. An educational device for teaching the fundamental principles of character building, comprising a series of blocks having various shapes and sizes so designated and adapted to be so arranged that the designations, arrangements, shapes and sizes will illustrate moral character, the designations taken in conjunction with the positions of the blocks in the arrangement, being indicative of various major and minor principles upon which moral character is based.

In witness whereof, I have hereunto set my hand this 1st day of June, 1924.

OLGA H. WHITE.